S. O. ARNOLD.
SLED ATTACHMENT.
APPLICATION FILED JAN. 15, 1912.
1,047,141.
Patented Dec. 17, 1912.
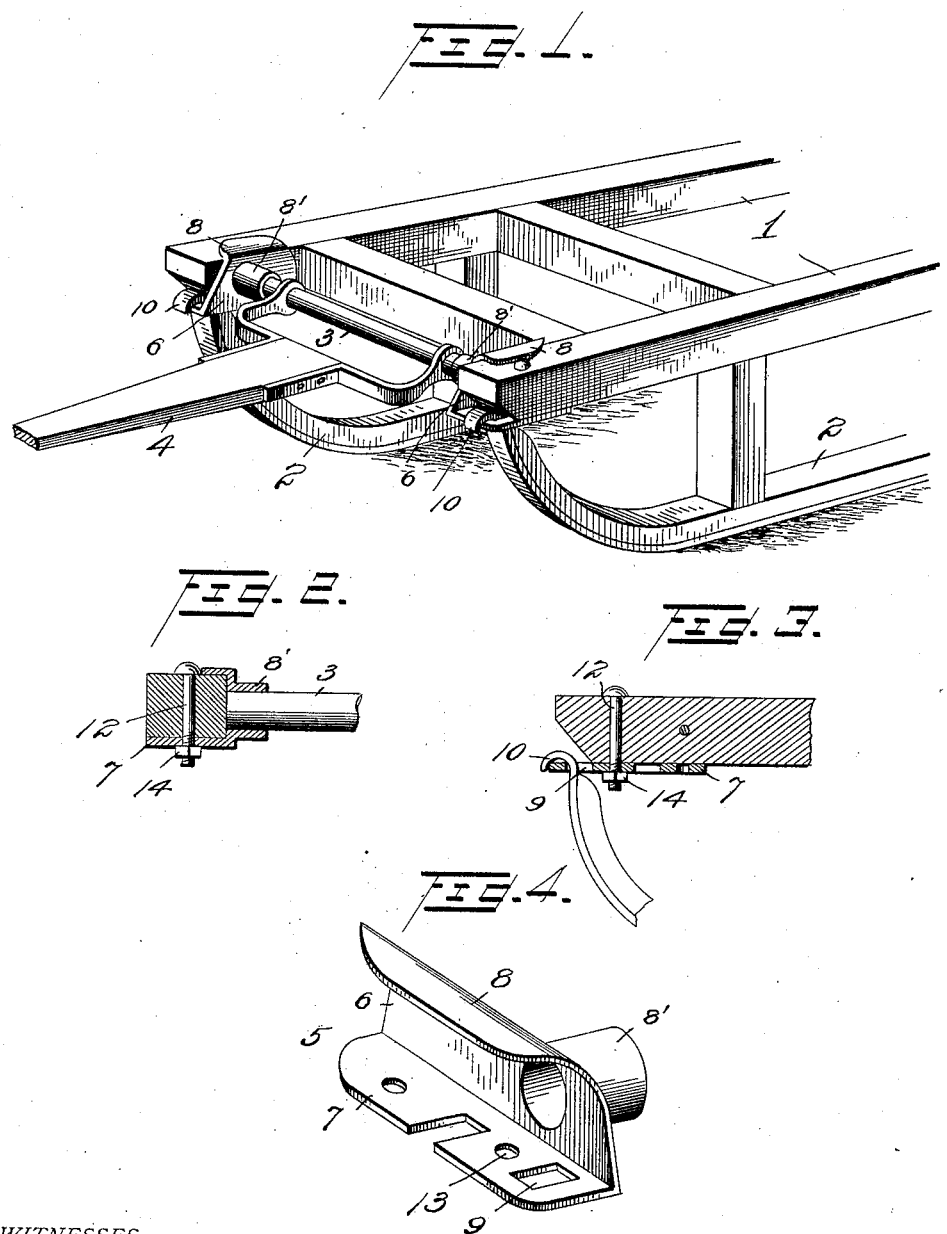
WITNESSES
INVENTOR
Samuel O. Arnold
By
Attorney

UNITED STATES PATENT OFFICE.

SAMUEL O. ARNOLD, OF PEEBLES, OHIO.

SLED ATTACHMENT.

1,047,141. Specification of Letters Patent. Patented Dec. 17, 1912.

Application filed January 15, 1912. Serial No. 671,365.

*To all whom it may concern:*

Be it known that I, SAMUEL O. ARNOLD, a citizen of the United States, residing at Peebles, in the county of Adams and State of Ohio, have invented certain new and useful Improvements in Sled Attachments, of which the following is a specification.

This invention relates to new and useful improvements in sleds.

The primary object of this invention is to provide an attachment for the runners and tongue attaching roller of the sled which may be readily replaced, if broken, by simply removing the fastening bolts of the attachment. At present, when the roller referred to becomes broken, it is necessary that the sled be torn apart to replace the roller but by means of this invention, it is only necessary to remove the attaching bolts and replace the roller, leaving the sled in as good condition as before.

With the foregoing and other objects in view, the invention consists in the novel features of construction, combination and arrangement of parts illustrated in the drawings and more particularly pointed out in the appended claims.

In the accompanying drawings:—Figure 1 is a perspective view of the front portion of the frame of a sled, illustrating the application of my invention. Fig. 2 is a fragmentary sectional view, taken through one of the attaching plates, the adjacent longitudinal or side bar of the frame and one end of the roller. Fig. 3 is a longitudinal section taken through the attaching plate, the front end of one of the runners and the adjacent side bar of the sled frame, and Fig. 4 is a detail perspective view on an enlarged scale of one of the attaching plates.

Referring to the drawings for a more particular description of the invention, 1 indicates the side bars or pieces of the sled frame, 2 the runners, 3 the tongue attaching roller, 4 the tongue and 5 the attaching plates for the roller and front ends of the runners.

The attaching plates each comprise the inner vertical flat portions 6 which fit against the inner faces of the front ends of the side bars 1 of the sled frame, the right angularly bent portions 7 which are bent outwardly and fit the bottom faces of the side bars, and the outwardly bent flanges 8 which engage the tops of side members 1.

The inner faces of the vertical members 6 of the attaching plates are formed with the tubular bearings 8 which receive the ends of the roller 3. The right-angularly bent portions 7 of the attaching plates are provided at their front ends with the vertical apertures 9 to receive the hook shaped lugs 10, formed at the front ends of the runners 2, which project beyond the front ends of the side pieces 1.

The attaching plates are removably secured to the front ends of the side bars 1 by the fastening bolts 12, passing through apertures in the side bars and corresponding apertures 13 in the right-angularly bent portions 7 of the attaching plates and the nuts 14, screwing on the threaded ends of the bolts.

From the foregoing description taken in connection with the drawings, it will be evident that in order to replace the roller 3, it is only necessary to remove the fastening bolts 12, which not only facilitates the operation of replacing the roller but obviates the need of taking the parts of the sled apart.

From the foregoing description taken in connection with the drawings, it is thought that the construction and advantages of this invention will be readily understood without requiring a more extended explanation.

Having thus described my invention, what I claim as new, is:—

1. In a sled, attaching plates for the front ends of the runners and tongue attaching roller, said plates comprising vertical portions adapted to fit against the inner sides of the side bars of the frame and right-angularly bent bottom portions adapted to fit against the bottom faces of said side bars, the vertical portions of the attaching plates having tubular bearings to receive the ends of the tongue attaching roller and the right-angularly bent portions thereof having apertures at their front ends and bolt-receiving apertures, fastening bolts passing through the front ends of the side bars of the sled frame and the bolt-receiving apertures of the attaching plates, and hook shaped lugs formed at the front ends of the runners engageable with the apertures at the front ends of said right-angularly bent portions.

2. In a sled, attaching plates for the front ends of the runners and tongue attaching roller, said plates embracing the inner walls and the tops and bottoms of the side bars of the frame and comprising vertical portions having tubular bearings to receive the ends of the tongue attaching roller and right angularly bent portions embracing the bottoms of the side pieces and provided at their front ends with transverse apertures and hook-shaped lugs formed at the front ends of the runners engageable with the apertures above mentioned.

In testimony whereof I affix my signature in presence of two witnesses.

SAMUEL O. ARNOLD.

Witnesses:
   J. R. B. KESSLER,
   J. A. R. COUSER.

Copies of this patent may be obtained for five cents each, by addressing the "Commissioner of Patents, Washington, D. C."